(12) United States Patent
Calvert

(10) Patent No.: US 7,046,581 B2
(45) Date of Patent: May 16, 2006

(54) WELL-TO-WELL TOMOGRAPHY

(75) Inventor: Rodney William Calvert, Houston, TX (US)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 10/997,205

(22) Filed: Nov. 24, 2004

(65) Prior Publication Data
US 2005/0117452 A1   Jun. 2, 2005

Related U.S. Application Data

(60) Provisional application No. 60/526,060, filed on Dec. 1, 2003.

(51) Int. Cl.
G01V 1/40 (2006.01)
(52) U.S. Cl. ............... 367/57; 367/38; 367/56; 367/73
(58) Field of Classification Search ............... 367/38, 367/56, 57, 73
See application file for complete search history.

(56) References Cited

U.S. PATENT DOCUMENTS

| | | | |
|---|---|---|---|
| 3,812,457 A | 5/1974 | Weller ................. | 340/15.5 |
| 4,390,973 A | 6/1983 | Reitsch ................ | 367/40 |
| 4,819,214 A | 4/1989 | Gutowski et al. ....... | 367/27 |
| 5,012,453 A | 4/1991 | Katz .................. | 367/57 |
| 5,067,113 A | 11/1991 | Hanson et al. ......... | 367/50 |
| 5,144,590 A * | 9/1992 | Chon .................. | 367/57 |
| 5,235,857 A | 8/1993 | Anderson ............. | 73/625 |
| 5,481,501 A * | 1/1996 | Blakeslee et al. ...... | 367/57 |
| 5,596,548 A | 1/1997 | Krebs ................ | 367/56 |
| 5,742,560 A * | 4/1998 | Krebs ................ | 367/57 |
| 5,963,508 A * | 10/1999 | Withers .............. | 367/38 |
| 6,125,330 A | 9/2000 | Robertson et al. ...... | 702/14 |
| 6,388,947 B1 * | 5/2002 | Washbourne et al. .... | 367/73 |
| 6,456,566 B1 * | 9/2002 | Aronstam ............. | 367/86 |
| 6,894,949 B1 * | 5/2005 | Aronstam ............. | 367/57 |

FOREIGN PATENT DOCUMENTS

| | | |
|---|---|---|
| EP | 0443234 B1 | 7/1994 |
| WO | 02/075363 A1 | 9/2002 |
| WO | 03/023449 A1 | 3/2003 |
| WO | 03/023450 | 3/2003 |

OTHER PUBLICATIONS

Weisstein, Eric W. "Cross Correlation." From MathWorld—A Wolfram Web Resource. http://mathworld.wolfram.com/Cross-Correlation.html. 1999.*

(Continued)

*Primary Examiner*—Jack Keith
*Assistant Examiner*—Scott A. Hughes

(57) ABSTRACT

A method of obtaining a spatial model of a property of part of a subsurface formation located between underground seismic receivers in which at least two sets of pairs of seismic receivers are utilized and one pair of receivers is used to record a signal from a seimic source and obtaining a response by solving $(s_{11}(-t) \otimes s_{21}(t)) = r_{11,21}(t) \otimes (s_{11}(-t) \otimes s21(t))$, wherein the symbol $\otimes$ denotes convolution and wherein $s_{11}(-t)$ is the time-reverse of the signal $s_{11}(t)$. A path-related attribute is selected from transmission response $r_{11,21}(t)$ that corresponds to the property of the subsurface formation and a tomographic reconstruction technique is applied to the path-related attribute to obtain the spatial model of the property of part of the subsurface formation.

2 Claims, 1 Drawing Sheet

OTHER PUBLICATIONS

Digital Geophysical Analysis.*

Ellis, et al. "Cross-Borehole Sensing: Identification and Localization of Underground Tunnels in the Presence of Hotizontal Stratification." 1997, IEEE.*

Daley, et al. "Orbital vibrator seismic source for simultaneous P and S wave crosswell acquisition." Geohpysics, Sep.-Oct. 2001.*

Rector, et al. "Characterization of resolution and uniqueness in crosswell direct-arrival traveltime tomography using the Fourier projection slice theorem." Geophysics, Nov. 1994.*

Meehan, et al. "Rekindling interest in Seismic While Drilling." Oilfield Review, Jan. 1993.*

Pratt, et al. "Combining wave-equation imaging with traveltime tomography to form high-resolution images from crosshole data." Geophysics, Feb. 1991.*

Bois, et al. "Well-to-well seismic measurements." Geophysics, Jun. 1972.*

Crosshole seismic tomography, N D Bregman, R C Bailey, C H Chapman, Geophysics, vol. 54, No. 2 pp. 200-215.

* cited by examiner

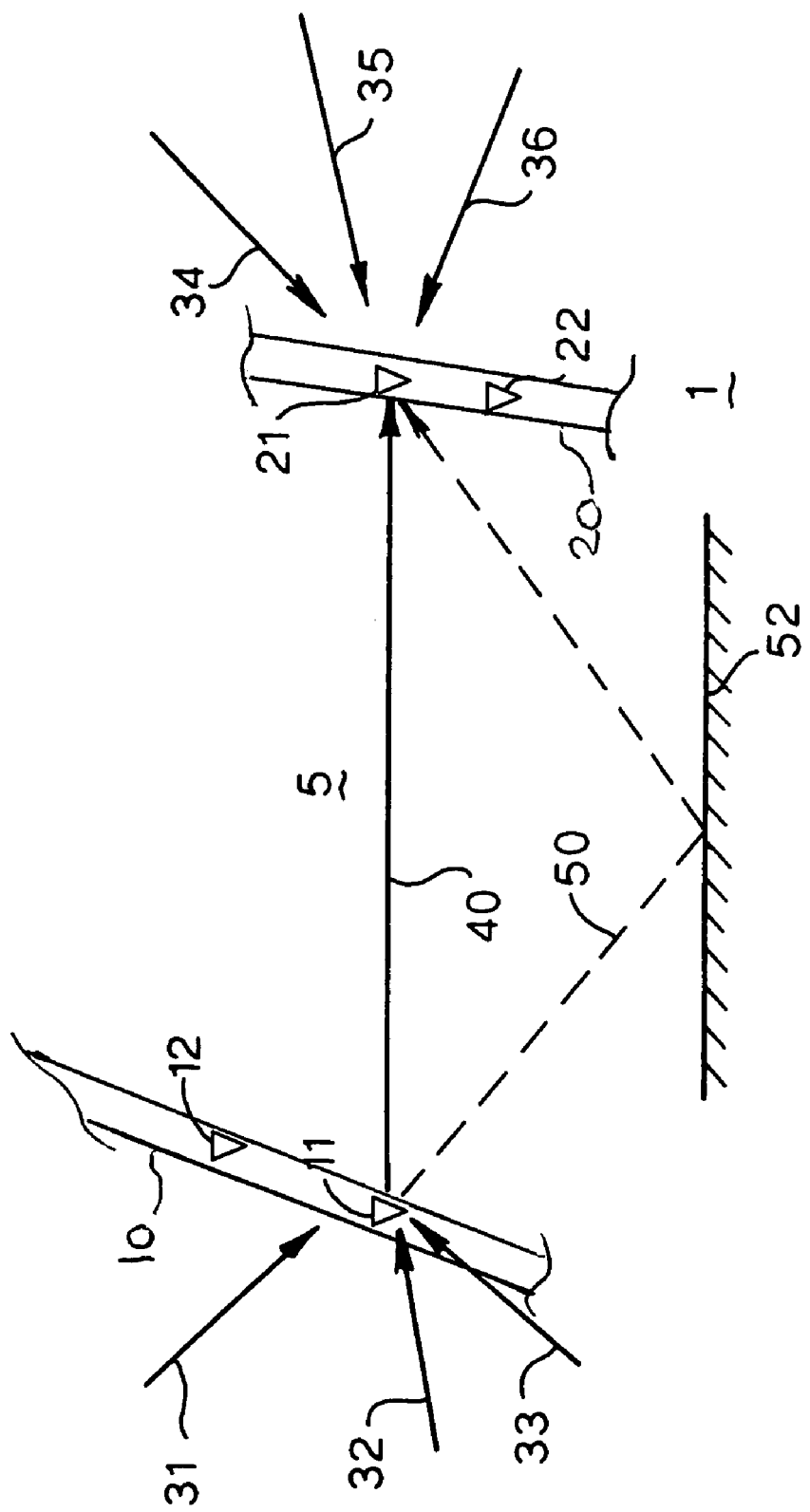

WELL-TO-WELL TOMOGRAPHY

PRIORITY CLAIM

The present application claims priority on U.S. Provisional Application No. 60/526,060, filed Dec. 1, 2003.

BACKGROUND OF THE INVENTION

The present invention relates to a method of well-to-well tomography, which is a method to obtain geologic details of an underground formation from sound waves traversing the formation. In particular well-to-well tomography is a method of obtaining a spatial model of a property of part of a subsurface formation located between underground seismic receivers.

In a way, the formation between seismic receivers can be regarded as a complex transmission medium in the sense as referred to in Applicant's International patent application publication No. 03/023450. This publication deals with a method of seismic imaging a subsurface formation, wherein a complex transmission medium is present between a set of seismic sources and a set of seismic receivers. The method described in this publication serves to reduce the adverse effects of the presence of the complex transmission medium on the seismic image of the subsurface formation. In order to enable reducing the adverse effects of the complex transmission medium, the known method proposes to create a virtual source at the position of a receiver.

To explain how the virtual source is created, we assume that there is only one seismic source (above the complex transmission medium) and one or more receivers (below the complex transmission medium). The signal reflected from the subsurface layer under the seismic receiver is adversely affected by the presence of the complex transmission medium. To remove this adverse effect, part of the signal received at the receiver (which is designated to be a virtual source) is time-reversed and convolved with the signal. The convolved signal is now a signal that is received by the receiver(s) from a virtual source at the designated receiver. This convolved signal is thus not affected by the complex transmission medium between the real source and the virtual source. Suitably, the part of the signal that is used is associated with the earlier or more direct arrivals from the source to the receiver. In addition, the virtual source will be a symmetrical wavelet at time zero.

SUMMARY OF THE INVENTION

Applicant now proposes to apply the notion of a virtual source in order to obtain geologic details in selected planes in the underground formation.

Thereto the method of obtaining a spatial model of a property of part of a subsurface formation located between underground spaced-apart seismic receivers according to the present invention comprises the steps of:

(a) positioning in a borehole a first set of seismic receivers and positioning in a borehole a second set of seismic receivers;

(b) selecting at least one pair of seismic receivers, wherein each pair of seismic receivers consists of a seismic receiver i of the first set and a seismic receiver j of the second set;

(c) recording for the pair(s) of seismic receivers i and j signals $s_i(t)$ and $s_j(t)$ obtained from a seismic source;

(d) obtaining for each of the pair(s) a transmission response $r_{ij}(t)$ of the formation between the two seismic receivers of the pair by solving $(s_i(-t) \otimes s_j(t)) = r_{ij}(t) \otimes (s_i(-t) \otimes s_i(t))$, wherein the symbol $\otimes$ denotes convolution and wherein $s_i(-t)$ is the time-reverse of the signal $s_i(t)$);

(e) selecting a path-related attribute of the transmission response $r_{ij}(t)$ that corresponds to the property of the subsurface formation; and (f) applying a tomographic reconstruction technique to the path-related attribute of the transmission response(s) $r_{ij}(t)$ to obtain the spatial model of the property of part of the subsurface formation.

We would observe that it can be shown that the convolution of the time-reverse of the signal with the signal is equivalent to the auto-correlation of the signal, or in equation:

$$s_i(-t) \otimes s_i(t) = \int_{-\infty}^{\infty} s_i(u) s_i(u-t) du \qquad (1)$$

And that the convolution of a time-reverse of a signal and another signal is equivalent to the cross-correlation of the two signals, or in equation:

$$s_i(-t) \otimes s_j(t) = \int_{-\infty}^{\infty} s_i(u) s_j(u-t) du \qquad (2)$$

For the sake of completeness reference is made to U.S. Pat. No. 3,812,457. This publication is concerned with a method of seismic exploration that does not require a seismic source using seismic receivers at surface. The publication discloses two methods. In one method signals of two seismic receivers are cross-correlated to obtain a correlogram, and a set of correlograms can be displayed for seismic analysis and interpretation. In another method, signals of several seismic receivers are added to obtain one signal that is auto-correlated to provide a correlogram, which is displayed in the form of a reflection seismic data trace.

U.S. Pat. No. 5,012,453 relates to producing an inverse seismic profile using a seismic source placed downhole in a borehole and a seismic receiver at surface. The idea disclosed in this publication is that the autocorrelation of a recorded seismic signal yields the autocorrelation function of the transmission response.

U.S. Pat. No. 4,390,973 relates to a method of determining the extent of an area in which an underground reaction, such as gasification of coal, takes place. In this method, acoustic signals from the reaction area are recorded by two or more underground seismic receivers. The recorded signals are cross-correlated as a function of a time shift between the recorded signals so that the position of the reaction zone can be obtained from cross-correlation.

BRIEF DESCRIPTION OF THE DRAWINGS

The present invention will now be explained by way of example in more detail with reference to the accompanying FIGURES in which:

FIG. 1 is a schematic of a horizontal section through an underground formation with seismic receivers arranged for use in the method of the present invention.

DETAILED DESCRIPTION OF THE PREFERRED EMBODIMENT

FIG. 1 shows a horizontal section through an underground formation 1. Two boreholes (10 and 20) are drilled through the underground formation, and in the parts of the borehole that are adjacent to a zone 5 in the underground formation that is to be studied, seismic receivers are arranged.

A first set of seismic receivers i, wherein i is 11 and 12 has been arranged in the first borehole 10 and a second set of seismic receivers j, wherein j is 21 and 22 has been arranged in the second borehole 20. The second borehole is spaced apart from the first borehole.

Having positioned the seismic receivers 11, 12, 21 and 22, the method of the present invention continues with selecting at least one pair of seismic receivers, wherein each pair of seismic receivers consists of a seismic receiver i of the first set and a seismic receiver of the second set j. Let us take as an example the pair consisting of the seismic receivers 11 and 21.

For the pair(s) of seismic receivers signals $s_i(t)$ and $s_j(t)$ are recorded, which are obtained from a seismic source.

In this case there are several seismic sources, which emit acoustic waves of which the directions are indicated by the arrows 31, 32, 33, 34, 35 and 36. The seismic sources can be natural ones, for example earthquakes and environmental noise, or artificial ones, such as drilling in a nearby borehole or tubewaves generated in a nearby borehole, production from a nearby wells, or even various seismic sources on the surface.

The acoustic waves 31–36 have a component in the direction from the first seismic receiver 11 to the second seismic receiver 21. The wave path of this component is shown as an arrow referred to with reference numeral 40.

For the first pair the signals $s_i(t)=s_{11}(t)$ and $s_j(t)=s_{21}(t)$ are recorded. It is an object of the present invention to obtain from these signals information over the zone of interest 5. To this end we assume that the signal $s_{21}(t)$ received by the seismic receiver 21 is the signal $s_{11}(t)$ received by the seismic receiver 11 having passed through the zone of interest 5, which has a transmission response $r_{ij}(t)=r_{11,21}(t)$, the separator is used for clarification only. In other words the signal $s_{11}(t)$ is considered to be emitted by a source at the location of the first seismic receiver 11 and the filtered signal is received at the seismic receiver 21. In equation:

$$s_{21}(t)=s_{11}(t) \otimes r_{11,21}(t) \quad (3)$$

In equation (3) the symbol $\otimes$ denotes convolution.

The transmission response $r_{11,21}(t)$ for the first pair of seismic receivers can be obtained by cross-correlating the terms of equation (3) with the signal $s_{11}(t)$. This gives:

$$s_{21}(t) \otimes s_{11}(-t)=s_{11}(t) \otimes r_{11,21}(t) \otimes s_{11}(-t) \quad (4)$$

In this equation $s_{11}(-t)$ is the time-reverse of the signal $s_{11}(t)$.

Rearranging the terms in equation (4) gives $$(s_{21}(t) \otimes s_{11}(-t))=r_{11,21}(t) \otimes (s_{11}(t) \otimes s_{11}(-t)) \quad (5)$$

In this equation is $s_{11}(t) \otimes s_{11}(-t)$ the auto-correlation of the signal $s_{11}(t)$ as defined in equation (1).

Solving equation (5) results in the transmission response for the first pair of seismic receivers $r_{11,21}(t)$.

For each pair of seismic receivers i and j the transmission response $r_{ij}(t)$ of the formation between the two seismic receivers of the pair can be obtained by solving equation (5). In FIG. 1 receiver pairs 11 and 21, 11 and 22, 12 and 21, and 12 and 22 are shown.

The next step in the method according to the present invention is selecting a path-related attribute of the transmission response $r_{ij}(t)$ that corresponds to the property of the subsurface formation. Such an attribute can be the travel time $\tau_{ij}=\tau_{11,21}$ associated with the wave path 40 between the seismic receivers 11 and 21.

Then a tomographic reconstruction technique is applied to the attribute to obtain the spatial model of the property of part of the subsurface formation.

An example of a tomographic reconstruction technique is described in the article: Crosshole seismic tomography, N D Bregman, R C Bailey, C H Chapman, Geophysics, Vol. 54, No. 2, pages 200–215.

It will be understood that tomographic inversion of results from many paths between pairs of seismic receivers i and j. In general the seismic receivers will be located in multiple boreholes, but they can as well be arranged in any kind of underground cavity, such as a tunnel.

As shown in FIG. 1, the seismic receiver 21 will also receive signals that differ from signals that directly pass from the seismic receiver 11 to the seismic receiver 21. An example is shown by dashed line 50, representing the path along which a wave travels from the seismic receiver 11 to the seismic receiver 21 via a reflector 52. However if we take a sufficiently long listening period and the signals are sourced randomly then the components that do not represent transmission between i and j will not correlate and will not contribute to our estimate of $r_{ij}(t)$. Through time the coherent energy arrivals representing paths between the seismic receivers i and j will build up over time proportional to recording time t such that $r_{ij}(t)$ amplitudes will build up as $t^2$. The non-correlating random signal will average to an expectation value of zero. Moreover, scattered energy will usually have a delay with respect to the direct arrival and is typically smaller by one or two orders of magnitude, hence the emphasis on the directly transmitted signal between i and j.

The transmission response $r_{ij}(t)$ will contain phase delays associated with P and S transmission times between the seismic receivers i and j. These will relate to P and S velocities in the subsurface formation. The transmission response $r_{ij}(t)$ will also show frequency absorption loss and other filtering processes associated with the particular elastic properties associated with the transmission path from seismic receivers i to j.

By combing $r_{ij}(t)$ between many pairs of suitably positioned seismic receivers geophones i and j we may form a tomographic reconstruction of delays and absorptions related to the properties of the subsurface formation. For instance, by repeating this during the production life of a field we may track reservoir changes with great sensitivity.

In the above description the waves 31, 32 and 32 and the associated signal energy passes from left to right. In this case transmission response $r_{ij}(t)$ will be one-sided with positive delays because the signal arrives at receiver 21 a positive time after passing receiver 11. When there are also waves passing from right to left (indicated with reference numerals 34, 35 and 36), the signal will arrive at receiver 21 before receiver 11. This implies that the signal will pass receiver 21 a negative time after passing receiver 11. If the energy is equally sourced then transmission response $r_{ij}(t)$ will be two-sided with both positive and equal reciprocal negative delays. This will enhance the method. In practice we may want to inject wide band signals into the earth e.g. as tube waves down wells, or drilling noise or other remote sources to improve our signals.

The seismic receivers that are suitably used in the method of the present invention are three-motion component geophone receivers, which are optionally provided with hydrophones. This allows taking multi-component and cross-component records. For example the x-component of the signal recorded with receiver i of the first set can be correlated with the y-component of receiver j of the second set. Such correlations can be used to better isolate compressional waves from fast and slow shear waves and different guide wave modes. In a time-lapse monitoring application these separate path attributes would allow separate estimations of fluid changes in porous rocks and possible stress and fracture changes along the travel path between seismic receivers i and j.

The method of the present invention is suitably applied in a formation that includes a low-velocity reservoir. This low-velocity reservoir can act as a wave-guide or part of a wave-guide. The significant parts of the energy travelling between the seismic receivers i and j would be in the form of trapped or guided wave modes that would have velocities, frequencies and relative amplitudes related to reservoir properties. In suitable near planar reservoirs, or parts of reservoirs, these data would be suitable for planar tomographic inversion of mode slowness and absorption yielding information on the spatial distribution of reservoir properties, which could be sensitively monitored in time.

The invention claimed is:

1. A method of obtaining a spatial model of a property of part of a subsurface formation located between underground spaced-apart seismic receivers, said method comprising the steps of:

(a) positioning in a borehole a first set of seismic receivers and positioning in a borehole a second set of seismic receivers;

(b) selecting at least one pair of seismic receivers, wherein each pair of seismic receivers consists of a seismic receiver i of the first set and a seismic receiver j of the second set;

(c) recording for the pair(s) of seismic receivers i and j signals $s_i(t)$ and $s_j(t)$ obtained from a seismic source;

(d) obtaining for each of the pair(s) a transmission response $r_{ij}(t)$ of the formation between the two seismic receivers of the pair by solving $(s_i(-t) \otimes s_j(t)) = r_{ij}(t) \otimes (s_i(-t) \otimes s_i(t))$, wherein the symbol $\otimes$ denotes convolution and wherein $s_i(-t)$ is the time-reverse of the signal $s_i(t)$;

(e) selecting a path-related attribute of the transmission response $r_{ij}(t)$ that corresponds to the property of the subsurface formation; and (f) applying a tomographic reconstruction technique to the path-related attribute of the transmission response(s) $r_{ij}(t)$ to obtain the spatial model of the property of part of the subsurface formation.

2. The method according to claim 1, wherein the first set of seismic receivers i is arranged in a first borehole and the second set of seismic receivers j is arranged in a second borehole, spaced apart from the first borehole.

* * * * *